(12) United States Patent
Fujisaki et al.

(10) Patent No.: US 7,457,045 B2
(45) Date of Patent: Nov. 25, 2008

(54) ZOOM LENS

(75) Inventors: Toyokatsu Fujisaki, Utsunomiya (JP); Tsunefumi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/969,738

(22) Filed: Jan. 4, 2008

(65) Prior Publication Data
US 2008/0186588 A1   Aug. 7, 2008

(30) Foreign Application Priority Data
Jan. 10, 2007   (JP)  ............................. 2007-002056

(51) Int. Cl.
*G02B 15/14* (2006.01)
(52) U.S. Cl. ................. 359/680; 359/681; 359/682; 359/689; 359/716; 359/740; 359/784
(58) Field of Classification Search ......... 359/680–682, 359/689, 716, 740, 784
See application file for complete search history.

(56) References Cited

U.S. PATENT DOCUMENTS

| | | | |
|---|---|---|---|
| 6,304,389 B1 | 10/2001 | Shibayama | |
| 6,618,210 B2 | 9/2003 | Noguchi | |
| 6,671,103 B2 * | 12/2003 | Itoh | 359/689 |
| 6,972,908 B2 * | 12/2005 | Noda | 359/680 |
| 2007/0103791 A1 * | 5/2007 | Hankawa et al. | 359/680 |

FOREIGN PATENT DOCUMENTS

| | | |
|---|---|---|
| JP | 4-114116 | 4/1992 |
| JP | 11-194274 | 7/1999 |
| JP | 2001-42218 | 2/2001 |
| JP | 2002-23053 | 8/2003 |

* cited by examiner

*Primary Examiner*—Evelyn A. Lester
(74) *Attorney, Agent, or Firm*—Canon USA Inc IP Div (57) ABSTRACT

A zoom lens includes, in order from an object side to an image side, a first lens unit of negative refractive power, a second lens unit of positive refractive power, and a third lens unit of positive refractive power. The first lens unit moves in a locus convex toward the image side and the second lens unit moves toward the object side during zooming from a wide-angle end to a telephoto end. The object side principal point position of the first lens unit is within the first lens unit. The movement locus of the image side principal point position of the first lens unit during zooming from the wide-angle end to the telephoto end intersects with the movement locus of the object side principal point position of the second lens unit during zooming from the wide-angle end to the telephoto end.

10 Claims, 11 Drawing Sheets

ZOOM LENS

BACKGROUND OF THE INVENTION

1. Field of the Invention

The present invention relates to a zoom lens, and more specifically, it relates to a small high-optical-performance zoom lens used in small image pickup apparatuses (for example, digital still cameras or digital video cameras).

2. Description of the Related Art

A zoom lens that includes three lens units of negative, positive, and positive refractive powers in order from the object side to the image side and that performs zooming by moving these lens units is widely used as a zoom lens for small digital cameras because the number of lenses is comparatively small and the size can be easily reduced (U.S. Pat. No. 6,618,210, Japanese Patent Laid-Open No. 11-194274, Japanese Patent Laid-Open No. 4-114116, and U.S. Pat. No. 6,304,389).

In U.S. Pat. No. 6,618,210, a zoom ratio of about three times is achieved with seven to ten lenses by specifying the refractive power and total magnification of the second and third lens units.

In Japanese Patent Laid-Open No. 11-194274, a compact zoom lens having a zoom ratio of about three times is achieved with seven lenses by specifying the locus of zooming and the refractive power of each lens unit.

In Japanese Patent Laid-Open No. 4-114116, a small zoom lens having a zoom ratio of about six times is achieved with seven to eight lenses by specifying the refractive power of the first and second lens units and the lens configuration.

In U.S. Pat. No. 6,304,389, a zoom lens having a zoom ratio of about five times and a field angle of 60° or more at the wide-angle end is achieved with nine to ten lenses by not moving the third lens unit during zooming from the wide-angle end to the telephoto end and appropriately setting the refractive power of each lens unit and the distances between the lens units.

However, these zoom lenses have a zoom ratio of about three to six times and do not meet the requirements of a small image pickup apparatus having a high zoom ratio of more than six times.

In recent years, zoom lenses for small digital cameras or digital video cameras have been required to be small and to have a high zoom ratio. In general, in order to increase the zoom ratio, it is necessary to increase the refractive power of each lens unit and to increase the moving distance during zooming. However, increasing the refractive power of each lens unit makes it difficult to obtain excellent optical performance throughout the zoom range with a small number of lenses. In order to obtain excellent optical performance, it is necessary to increase the number of lenses. This makes it difficult to reduce the size of the whole lens system. Increasing the moving distance during zooming increases the overall length of the zoom lens and makes it difficult to reduce the size of the whole lens system.

SUMMARY OF THE INVENTION

The present invention is directed to a zoom lens that includes a comparatively small number of lenses and that has a zoom ratio of more than six times and high optical performance throughout the zoom range, and to an image pickup apparatus having the same.

In an aspect of the present invention, a zoom lens includes, in order from an object side to an image side, a first lens unit of negative refractive power, a second lens unit of positive refractive power, and a third lens unit of positive refractive power. The first lens unit moves in a locus convex toward the image side and the second lens unit moves toward the object side during zooming from a wide-angle end to a telephoto end. An object side principal point position of the first lens unit is within the first lens unit. A movement locus of the image side principal point position of the first lens unit during zooming from the wide-angle end to the telephoto end intersects with a movement locus of the object side principal point position of the second lens unit during zooming from the wide-angle end to the telephoto end.

In another aspect of the present invention, an image pickup apparatus includes a zoom lens, and an image pickup element configured to detect light flux through the zoom lens. The zoom lens includes, in order from an object side to an image side, a first lens unit of negative refractive power, a second lens unit of positive refractive power, and a third lens unit of positive refractive power. The first lens unit moves in a locus convex toward the image side and the second lens unit moves toward the object side during zooming from a wide-angle end to a telephoto end. An object side principal point position of the first lens unit is within the first lens unit. A movement locus of the image side principal point position of the first lens unit during zooming from the wide-angle end to the telephoto end intersects with a movement locus of the object side principal point position of the second lens unit during zooming from the wide-angle end to the telephoto end.

Further features of the present invention will become apparent from the following description of exemplary embodiments with reference to the attached drawings.

DESCRIPTION OF THE EMBODIMENTS

Embodiments of the present invention will now be described.

Figure 1A:
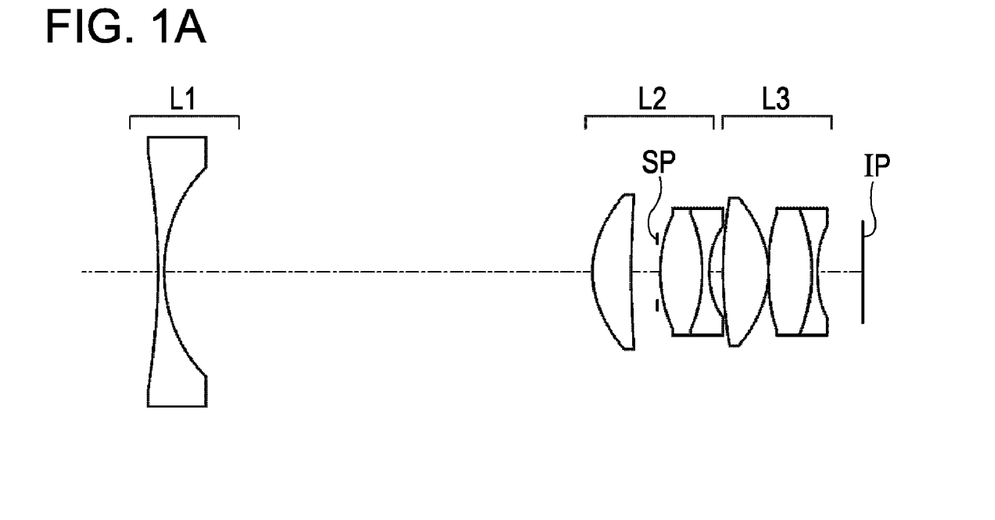
FIGS. 1A, 1B, and 1C are lens sectional views of Numerical Embodiment 1 of the present invention.
Figure 1B:
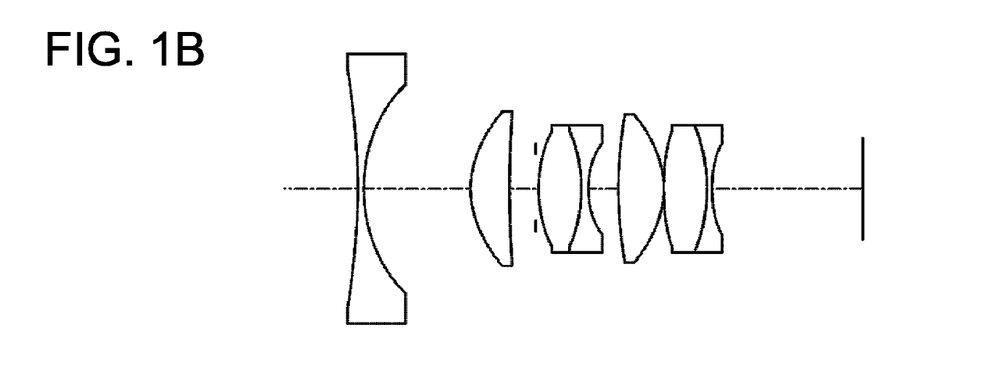
Figure 1C:
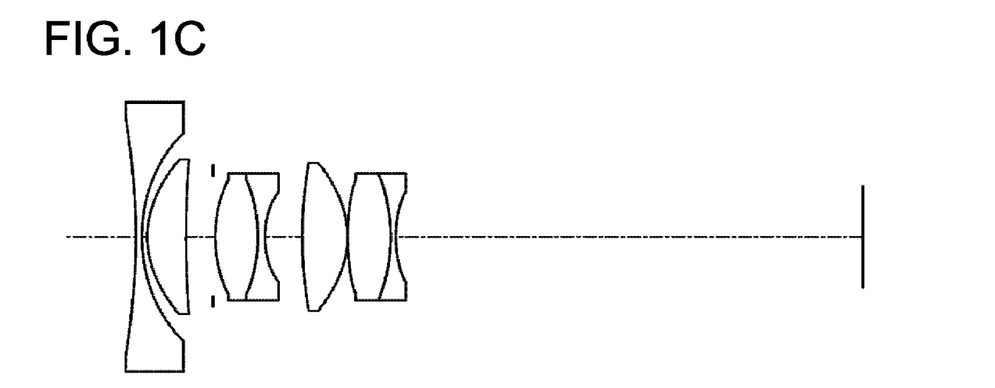
Figure 2A:
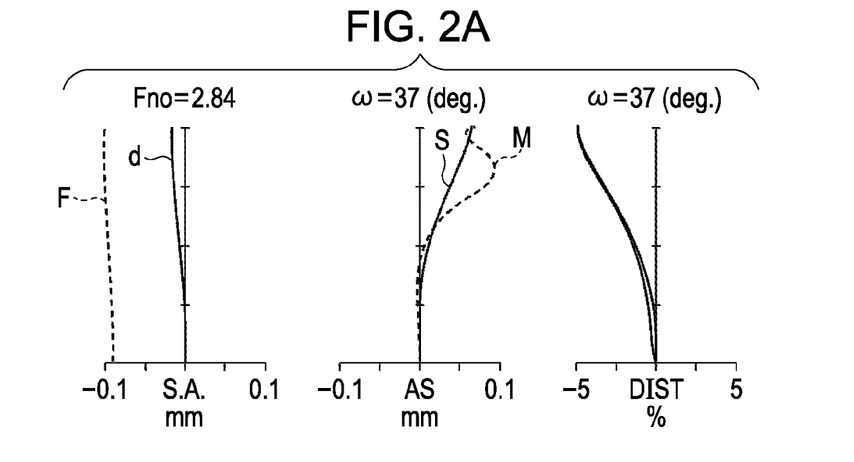
FIGS. 2A, 2B, and 2C illustrate aberrations of Numerical Embodiment 1 of the present invention.
Figure 2B:
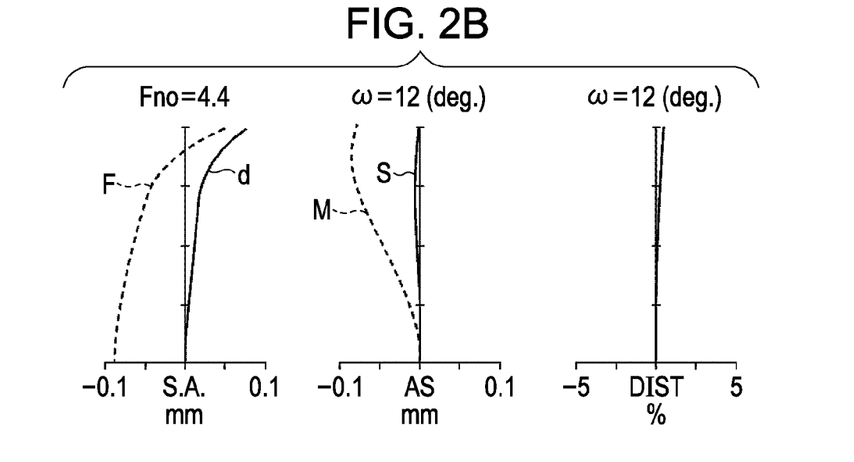
Figure 2C:
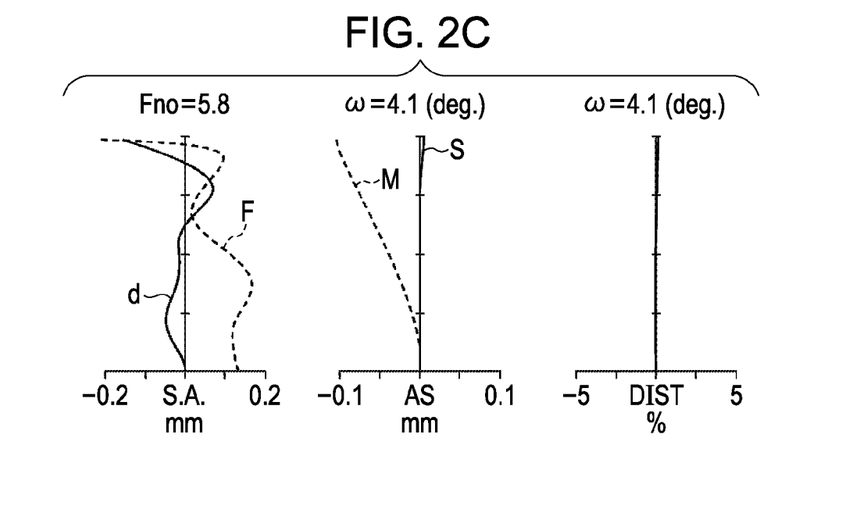

FIGS. 1A, 1B and 1C are lens sectional views of a zoom lens of Embodiment 1 of the present invention at the wide-angle end, a middle zoom position, and the telephoto end, respectively. FIGS. 2A, 2B and 2C are aberration diagrams of the zoom lens of Embodiment 1 at the wide-angle end, a middle zoom position, and the telephoto end, respectively.

Figure 3A:
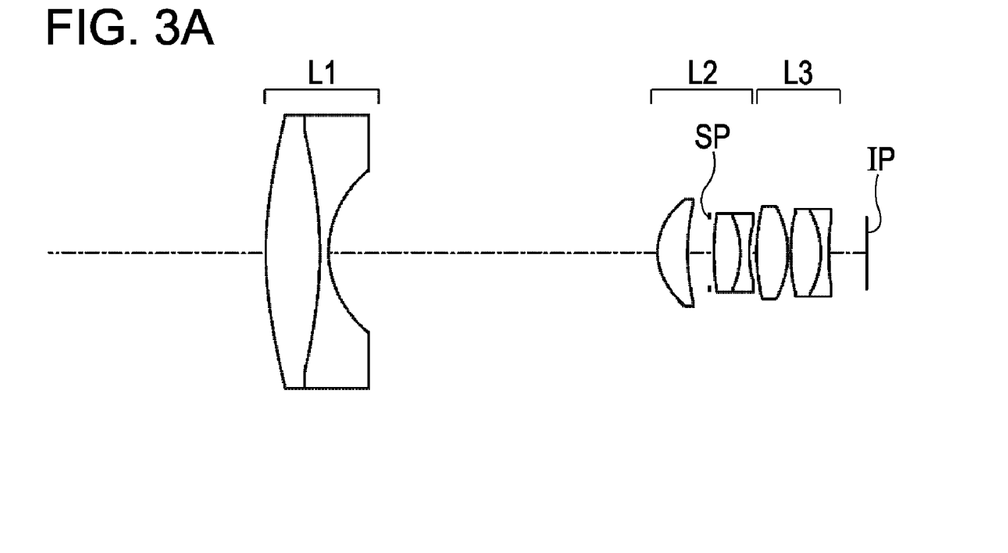
FIGS. 3A, 3B, and 3C are lens sectional views of Numerical Embodiment 2 of the present invention.
Figure 3B:
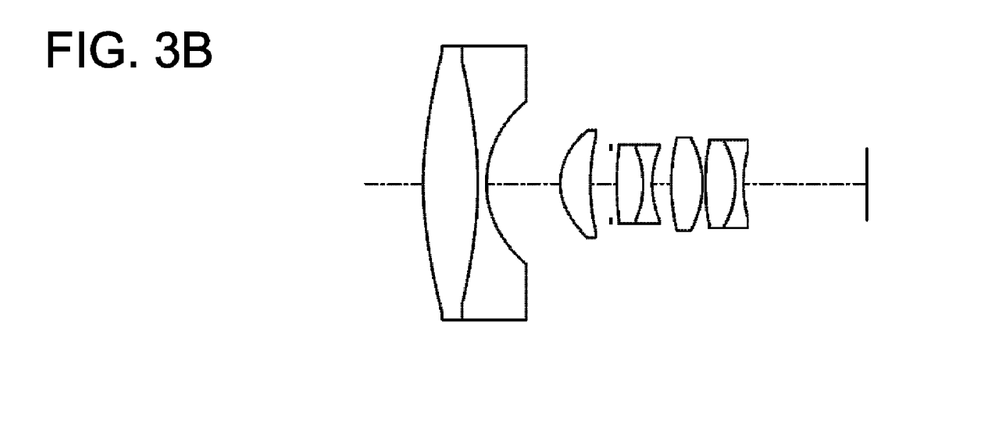
Figure 3C:
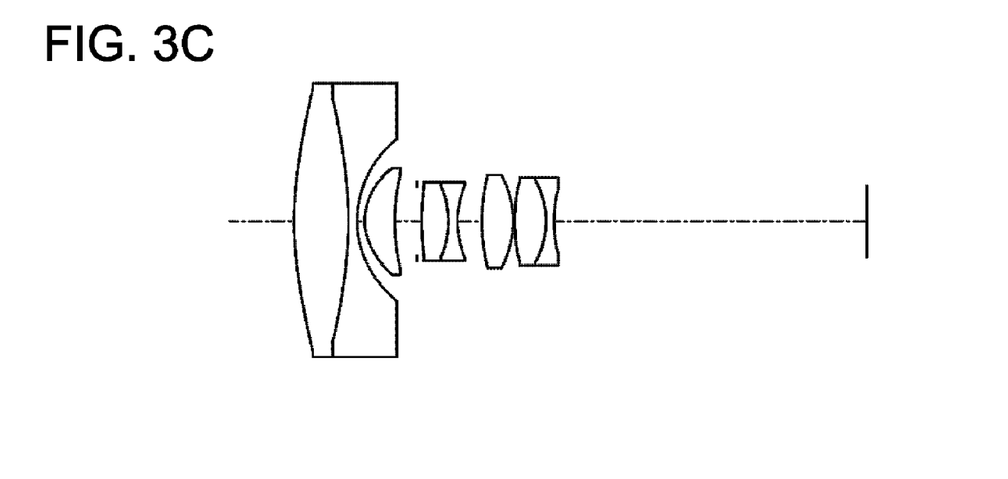
Figure 4A:
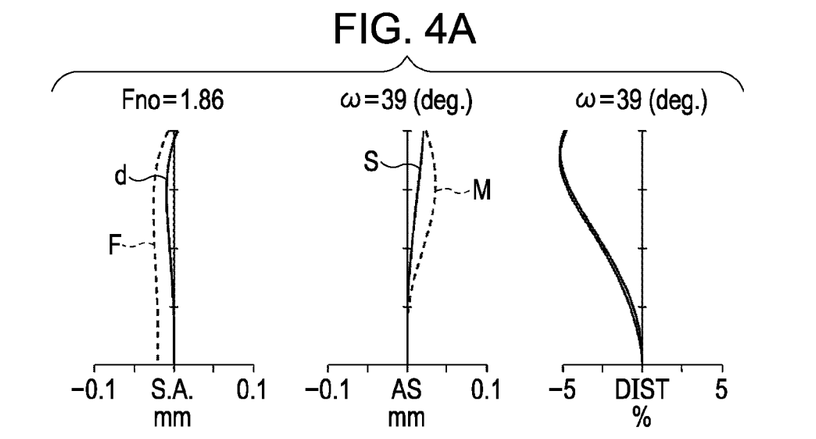
FIGS. 4A, 4B, and 4C illustrate aberrations of Numerical Embodiment 2 of the present invention.
Figure 4B:
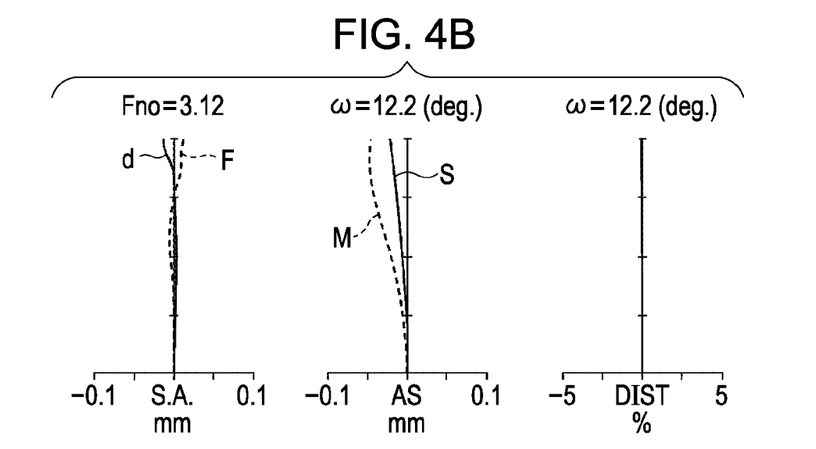
Figure 4C:
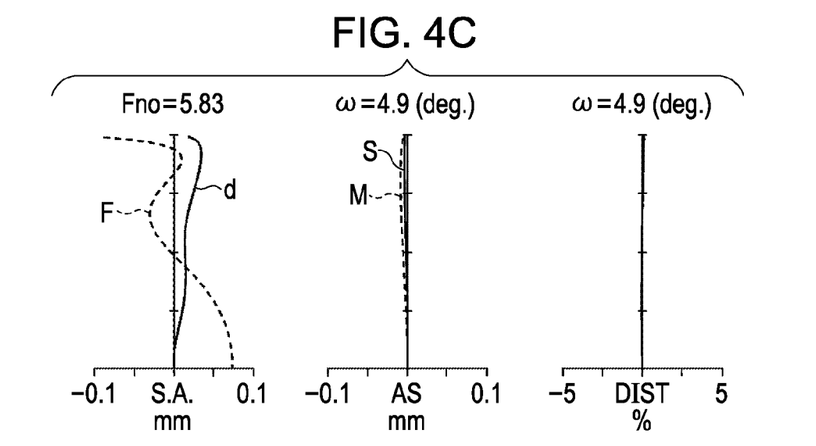

FIGS. 3A, 3B and 3C are lens sectional views of a zoom lens of Embodiment 2 of the present invention at the wide-angle end, a middle zoom position, and the telephoto end, respectively. FIGS. 4A, 4B and 4C are aberration diagrams of the zoom lens of Embodiment 2 at the wide-angle end, a middle zoom position, and the telephoto end, respectively.

Figure 5A:
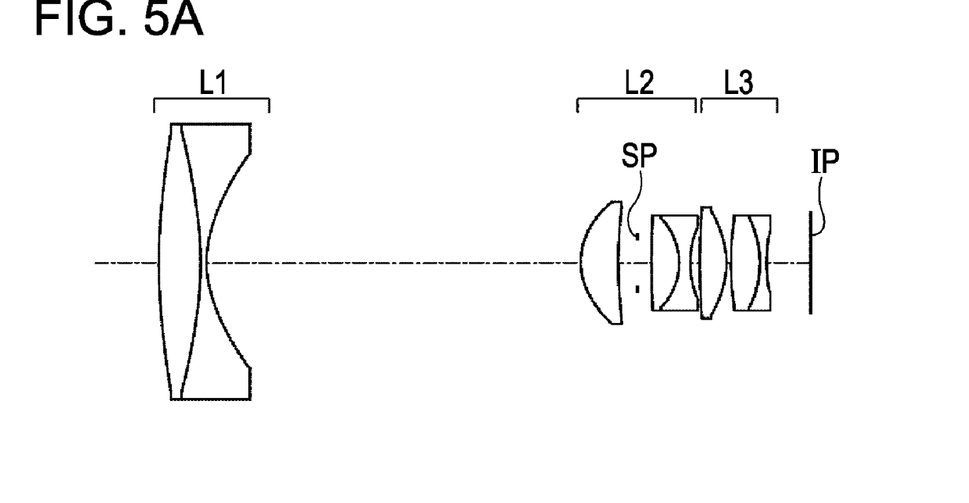
FIGS. 5A, 5B, and 5C are lens sectional views of Numerical Embodiment 3 of the present invention.
Figure 5B:
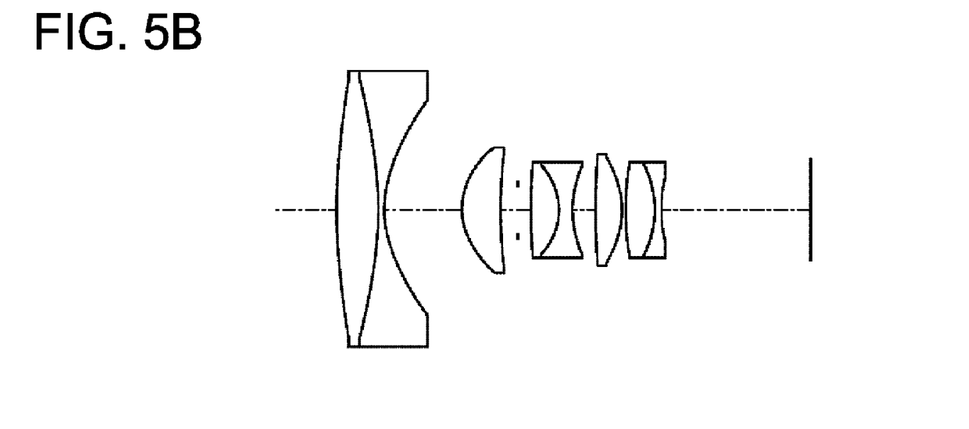
Figure 5C:
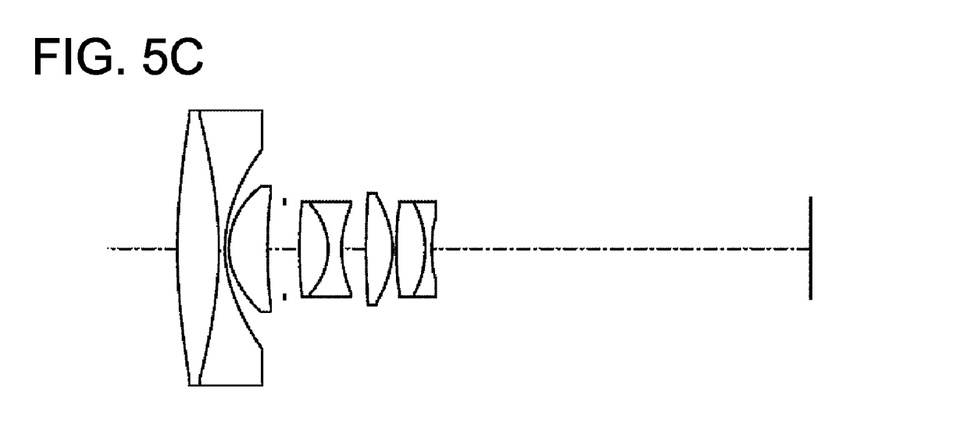
Figure 6A:
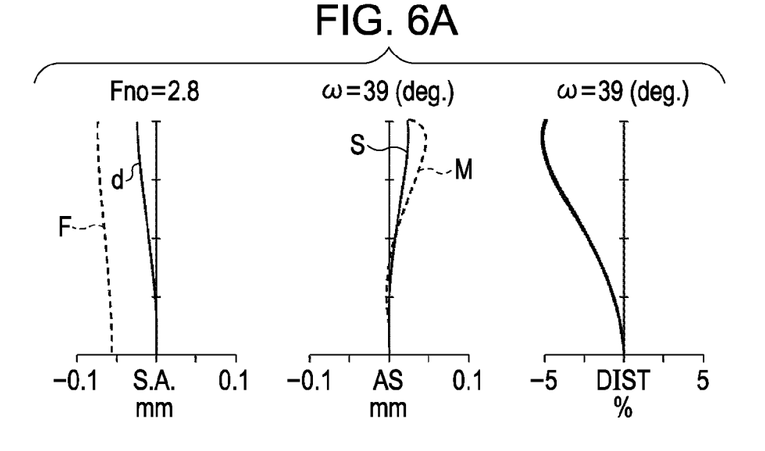
FIGS. 6A, 6B, and 6C illustrate aberrations of Numerical Embodiment 3 of the present invention.
Figure 6B:
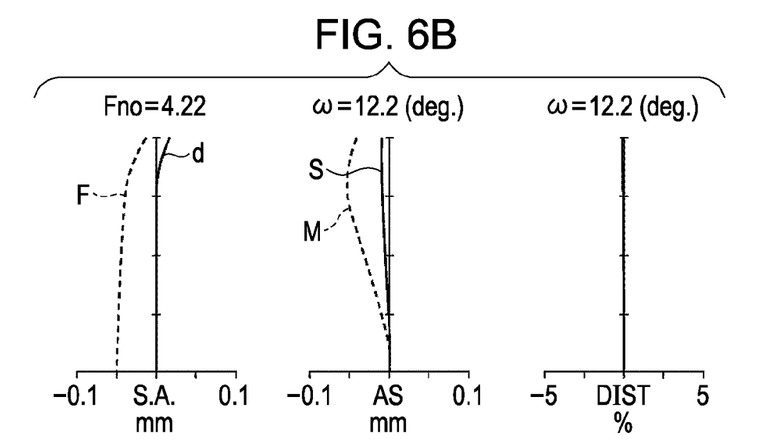
Figure 6C:
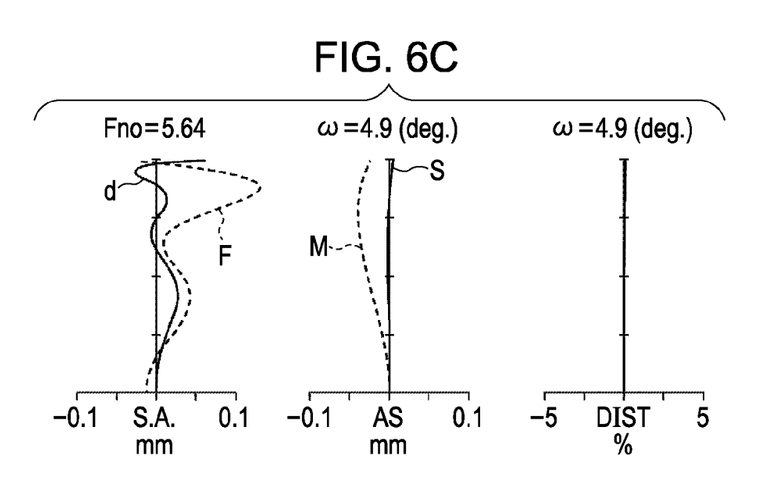

FIGS. 5A, 5B and 5C are lens sectional views of a zoom lens of Embodiment 3 of the present invention at the wide-angle end, a middle zoom position, and the telephoto end, respectively. FIGS. 6A, 6B and 6C are aberration diagrams of the zoom lens of Embodiment 3 at the wide-angle end, a middle zoom position, and the telephoto end, respectively.

Figure 7A:
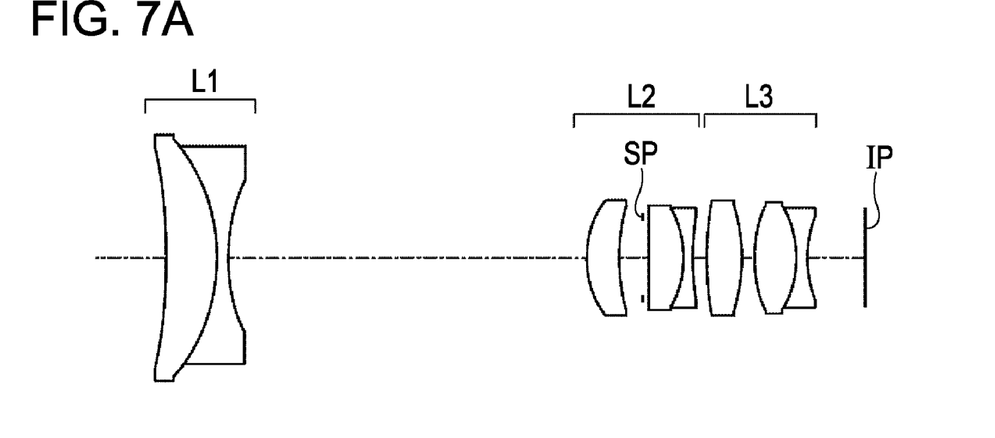
FIGS. 7A, 7B, and 7C are lens sectional views of Numerical Embodiment 4 of the present invention.
Figure 7B:
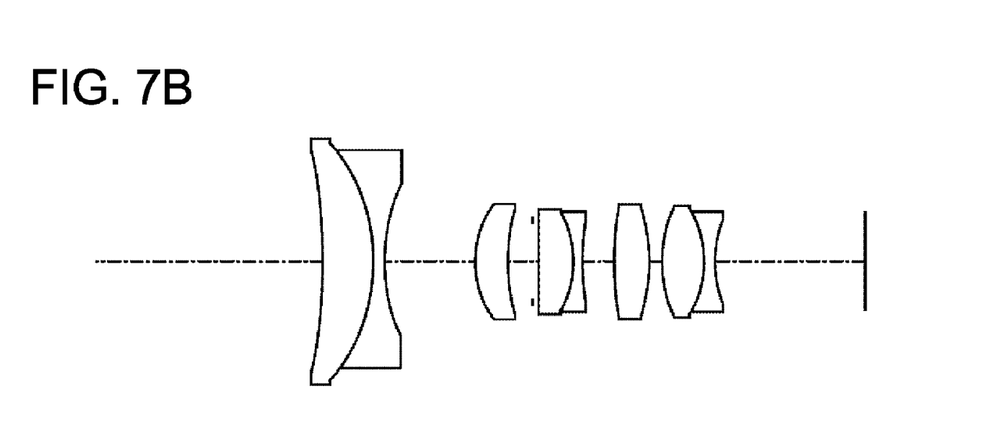
Figure 7C:
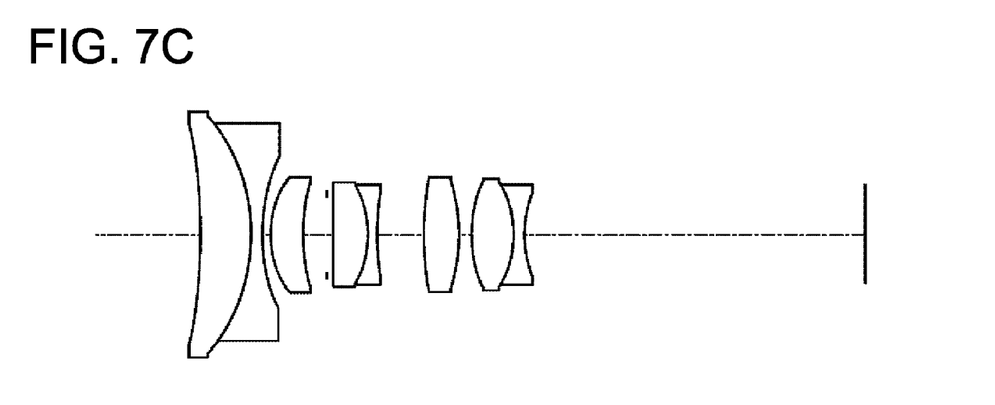
Figure 8A:
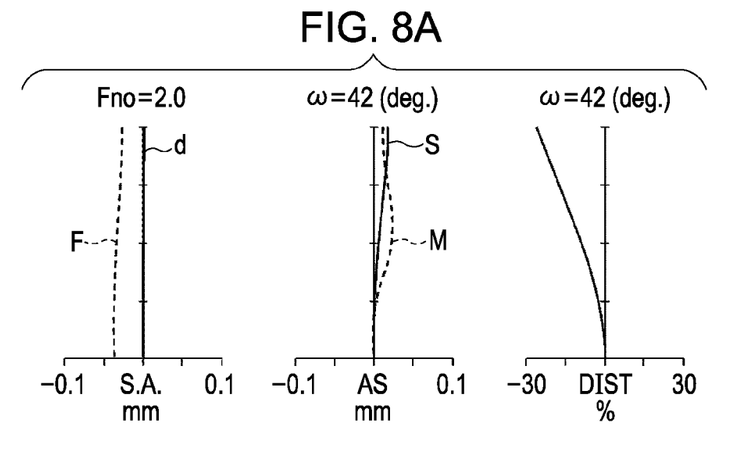
FIGS. 8A, 8B, and 8C illustrate aberrations of Numerical Embodiment 4 of the present invention.
Figure 8B:
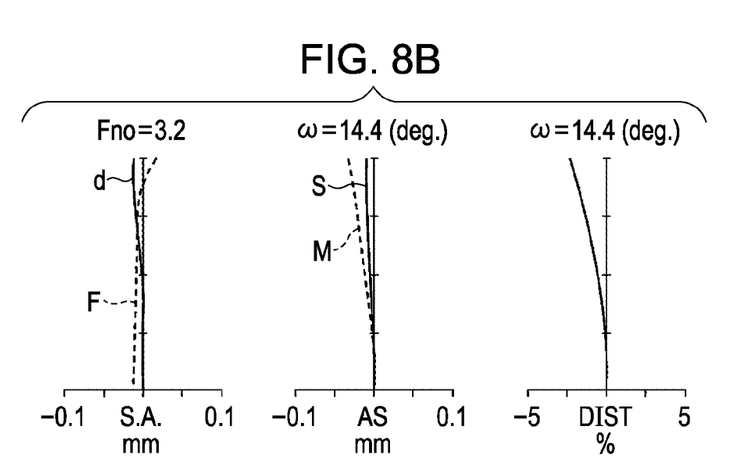
Figure 8C:
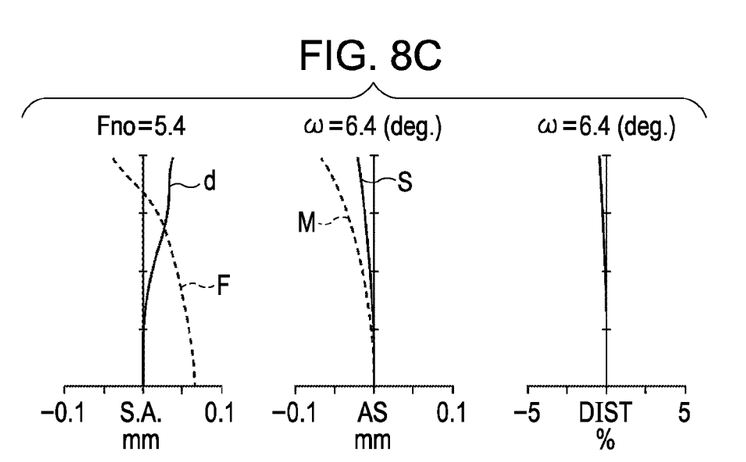

FIGS. 7A, 7B and 7C are lens sectional views of a zoom lens of Embodiment 4 of the present invention at the wide-angle end, a middle zoom position, and the telephoto end, respectively. FIGS. 8A, 8B and 8C are aberration diagrams of the zoom lens of Embodiment 4 at the wide-angle end, a middle zoom position, and the telephoto end, respectively.

Figure 9:
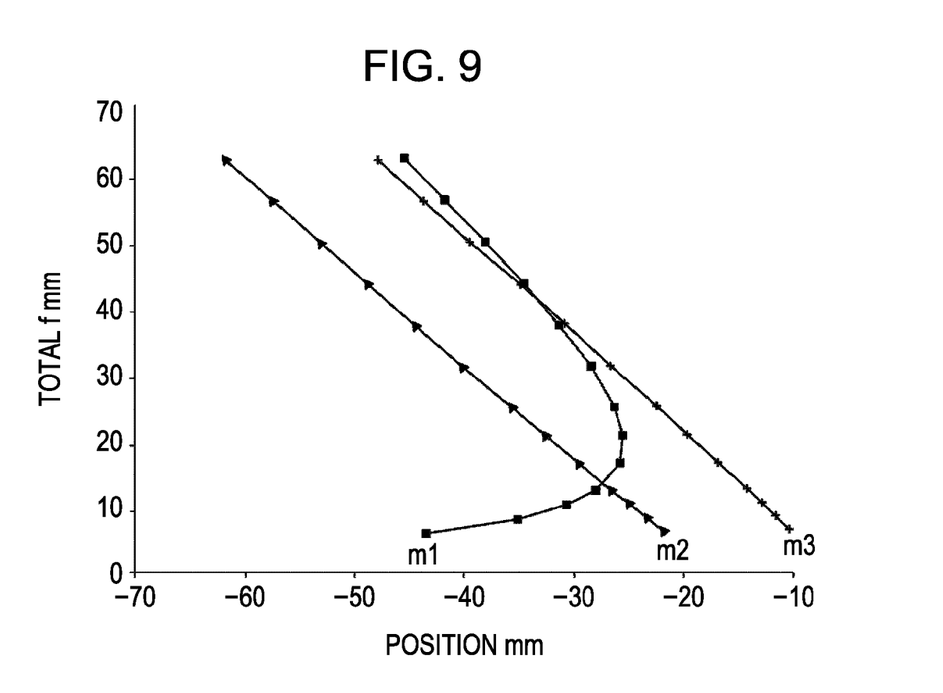
FIG. 9 illustrates the loci of principal point positions of Numerical Embodiment 1 of the present invention.
Figure 10:
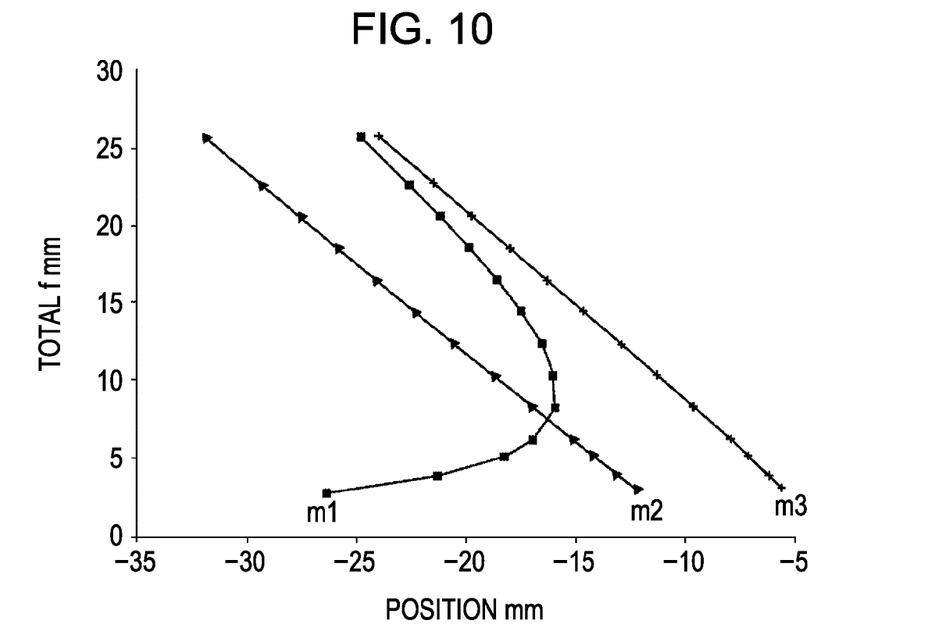
FIG. 10 illustrates the loci of principal point positions of Numerical Embodiment 2 of the present invention.

FIG. 9 illustrates the movement locus (m1) of the image side principal point of a first lens unit and the movement loci (m2 and m3) of the object side principal points of second and third lens units when the zoom lens of Embodiment 1 of the present invention zooms from the wide-angle end to the telephoto end.

Similarly to FIG. 9, FIGS. 10, 11, and 12 illustrate the movement locus (m1) of the image side principal point of a first lens unit and the movement loci (m2 and m3) of the object side principal points of second and third lens units when the zoom lenses of Embodiment 2, 3, and 4 of the present invention zoom from the wide-angle end to the telephoto end.

Figure 13:
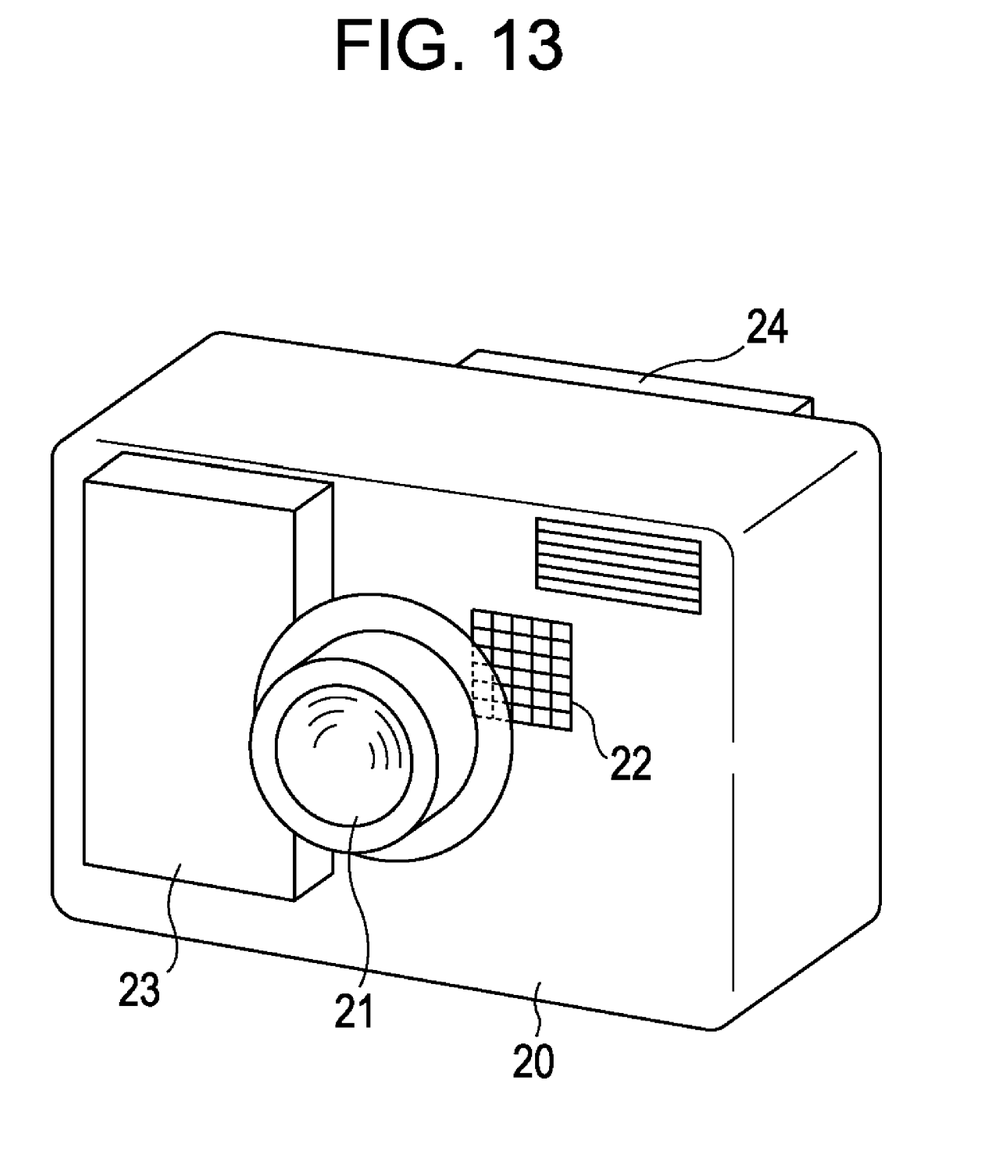
FIG. 13 is a schematic view of an embodiment of an image pickup apparatus of the present invention.

FIG. 13 is a schematic view of an image pickup apparatus having a zoom lens of the present invention.

The zoom lens of each embodiment is a photographing lens system used in image pickup apparatuses (optical apparatuses). In the lens sectional views, the left side is the object side (the enlargement conjugation side), and the right side is the image side (the reduction conjugation side, the image pickup element side).

In the lens sectional views, reference letter L1 denotes a first lens unit of negative refractive power (refractive power, optical power=the inverse of the focal length), reference letter L2 denotes a second lens unit of positive refractive power, and reference letter L3 denotes a third lens unit of positive refractive power.

Reference letter SP denotes an aperture stop, which is disposed in the second lens unit L2. Of course, this aperture stop may be disposed on the most object side or the most image side of the second lens unit. However, the aperture stop should be disposed between two adjacent lenses in the second lens unit.

Reference letter IP denotes an image plane, where a light-sensitive plane is placed. When the zoom lens is used as a photographing optical system for a video camera or a digital still camera, the light-sensitive plane corresponds to the image pickup plane of a solid-state image pickup element (photoelectric conversion element) such as a CCD sensor or a CMOS sensor.

In the aberration diagrams, reference letter S.A. denotes spherical aberration, reference letter AS denotes astigmatism, and reference letter DIST denotes distortion. Reference letters d and F denote the d-line and F-line, respectively. Reference letters M and S denote the meridional image plane and the sagittal image plane, respectively. Reference letter ω denotes the half field angle (2ω denotes the full field angle). Reference letter Fno denotes the F-number.

In the following embodiments, the wide-angle end and the telephoto end refer to zoom positions when the lens unit for zooming (second lens unit L2) is at either ends of a mechanically movable range on the optical axis.

Focusing is performed by moving the third lens unit L3 or the first lens unit L1.

In recent years, it has been desirable that photographing optical systems used in digital image pickup apparatuses be short in overall length and to have a zoom ratio of more than six times. Therefore, it is necessary to increase the refractive power and moving distance of each lens unit. However, increasing the refractive power of each lens unit increases the number of lenses of each lens unit in order to correct aberrations and increases the overall length. Increasing the moving distance of each lens unit also increases the overall length. In order to reduce the overall length, it is necessary to increase the refractive power of each lens unit and to minimize the distance e between the principal points at the wide-angle end.

Therefore, the zoom lenses of the embodiments have the following characteristics. The zoom lenses of the embodiment have, in order from the object side to the image side, a first lens unit of negative refractive power, a second lens unit of positive refractive power, and a third lens unit of positive refractive power. During zooming from the wide-angle end to the telephoto end, the first lens unit moves in a locus convex toward the image side (moves toward the image side part of the way and thereafter moves toward the object side) and the second lens unit moves toward the object side (does not move toward the image side and moves monotonously toward the object side). The object side principal point position of the first lens unit is within the first lens unit. In the zoom lens having such a configuration, the movement locus of the image side principal point position of the first lens unit during zooming from the wide-angle end to the telephoto end intersects with the movement locus of the object side principal point position of the second lens unit during zooming from the wide-angle end to the telephoto end.

More specifically, the object side principal point position and the image side principal point position of the first lens unit L1 are on the image side of the front surface (the most object-side optical surface) of the first lens unit L1, and the object side principal point position of the second lens unit L2 is on the object side of the front surface (the most object-side optical surface) of the second lens unit L2 so that the object side principal point position of the second lens unit L2 is close to the image side principal point position of the first lens unit L1. During zooming from the wide-angle end to the telephoto end, the first lens unit L1 moves in a locus convex toward the image side, and the second lens unit L2 moves from the image side toward the object side (moves monotonously). In addition, the image side principal point position of the first lens unit L1 switches positions with the object side principal point position of the second lens unit L2 during zooming from the wide-angle end to the telephoto end so that the object side principal point position of the second lens unit L2 is in front of the image side principal point position of the first lens unit L1 at the telephoto end. In other words, during zooming from the wide-angle end to the telephoto end, the movement locus of the image side principal point position of the first lens unit L1 intersects with the movement locus of the object side principal point position of the second lens unit L2.

Specifically, as shown in FIGS. 9 to 12 (Embodiments 1 to 4), during zooming from the wide-angle end to the telephoto end, the movement locus (m1) of the image side principal point position of the first lens unit L1 intersects with the movement locus (m2) of the object side principal point position of the second lens unit L2.

The refractive power φ of the whole lens system is determined by the refractive power of each lens unit (φ1, φ2 in the case of two lens units) and the distance e between principal points (the distance between the image side principal point of the first lens unit L1 and the object side principal point of the second lens unit L2). (The refractive power φ is represented by φ=φ1+φ2−eφ1φ2 in the case of two lens units.) When the image side principal point position of the first lens unit L1 is within or in front of the first lens unit and the object side principal point position of the second lens unit L2 is within or behind the second lens unit, the actual distance d between the first and second lens units is smaller than the distance e between the two principal points. In such a configuration, reducing the distance between the first and second lens units with the increase in zoom ratio causes the first lens unit L1 and the second lens unit L2 to interfere with each other before the distance e between the two principal points becomes zero. In order to increase the zoom ratio, it is necessary to lengthen the distance e between principal points at the wide-angle end and to shorten the actual distance d at the telephoto end. This makes downsizing difficult. In the configuration of the embodiments, the object side principal point position of the second lens unit L2 is on the object side of the front surface (the most object-side optical surface) of the second lens unit L2, the refractive power of each lens unit is increased at the wide-angle end, and the distance e between the two principal points is shortened. In such a configuration, the actual distance d between the first and second lens units is longer than the distance e between the two principal points.

Therefore, when the zoom ratio is increased, it is possible to cause the principal points to switch positions with each other without interference of lenses of each lens unit, and a zoom lens that is small and that has a high zoom ratio (of more than six times) can be achieved.

In this configuration, the object side principal point position of the second lens unit L2 is on the object side of the front surface (the most object-side optical surface) of the second lens unit L2. Alternatively, the image side principal point position of the first lens unit L1 may be behind the last surface (the most image-side optical surface) of the first lens unit L1 so as to be close to the object side principal point position of the second lens unit L2.

The following conditions (A) to (K) should be satisfied.

(A) The following condition should be satisfied:

$$0.3 < |f1/f2| < 1 \quad \text{conditional expression (1)}$$

where f1 is the focal length of the first lens unit L1 and f2 is the focal length of the second lens unit L2.

By limiting the ratio of the focal length of the first lens unit L1 to the focal length of the second lens unit L2 within the range of conditional expression (1), the back focus is secured and the overall length is shortened.

Falling below the lower limit of conditional expression (1) makes the refractive power of the first lens unit L1 too large and can make the reduction in overall length insufficient. In addition, mainly astigmatism is made difficult to correct. Exceeding the upper limit of conditional expression (1) makes the refractive power of the second lens unit L2 too large and makes it difficult to correct mainly spherical aberration and comatic aberration. In addition, by setting the focal lengths of the first lens unit L1 and the second lens unit L2 within this range, a zoom lens having a field angle of more than 60° at the wide-angle end can be achieved.

(B) In each embodiment, in order to increase the zoom ratio, the third lens unit L3 moves monotonously from the image side toward the object side during zooming from the wide-angle end to the telephoto end. Therefore, the third lens unit L3 contributes to zooming and corrects the position of the image plane. The term "move monotonously" here refers to not moving in the reverse direction, that is, toward the image side. The third lens unit L3 continues to move toward the object side during movement from the wide-angle end to the telephoto end. However, the present invention is not limited to this. As long as the third lens unit L3 moves toward the object side in at least one region, the third lens unit L3 may be at a stop in the other zoom region.

(C) An aperture stop SP is provided between two adjacent lenses in the second lens unit L2. The aperture stop SP moves together with the second lens unit L2 during zooming. Compared to the case where the aperture stop SP is disposed in front of the second lens unit L2, mechanical interference is minimized when the second lens unit L2 is moved toward the first lens unit L1, and a high zoom ratio is achieved. In addition, mainly during zooming, aberrations such as field curvature and chromatic aberration are generated substantially symmetrically in front of and behind the stop so as to be corrected.

(D) The second lens unit L2 includes at least three lenses of positive, positive, and negative refractive powers from the object side to the image side. The last lens (the most image-side lens) of the second lens unit L2 is a negative lens. This reduces the angle of off-axis rays entering the aperture stop SP and effectively corrects off-axis aberrations such as comatic aberration. Since the last lens is a negative lens, aberrations generated in the positive lenses of the second lens unit L2 are corrected within the second lens unit L2. Although the second lens unit L2 consists of three lenses in every numerical embodiment described below, the second lens unit L2 may include four or more lenses and a filter as long as the most image-side lens is a negative lens and the other lenses include two positive lenses.

(E) The most object-side lens of the second lens unit L2 is an aspheric lens convex toward the object side. The most object-side optical surface in the second lens unit L2 is an aspherical surface. This converges rays that are made to diverge by the first lens unit L1 and reduces the angle of off-axial rays incident on the stop so as to effectively correct aberrations.

(F) The first lens unit L1 consists of one or two lenses and at least one of the optical surfaces that the lenses have is an aspherical surface so that the increase in lens diameter on the wide-angle side is restrained. This reduces the weight of the first lens unit L1 moving during zooming and simplifies the mechanism. In addition, this reduces the angle of off-axial rays entering the second lens unit L2 and restrains off-axial aberrations mainly such as field curvature.

(G) The third lens unit L3 consists of at least two lenses including a negative lens and a positive lens.

Therefore, fluctuation in the angle of rays due to zooming fluctuation is restrained, and fluctuation in chromatic aberration due to zooming is reduced. In every numerical embodiment described below, the third lens unit L3 consists of two positive lenses and one negative lens. However, the present invention is not limited to this. The third lens unit L3 may consist of one positive lens and one negative lens or may consist of three positive lenses and one negative lens.

(H) The following condition should be satisfied:

$$0.3 < LT/fT < 1 \quad \text{conditional expression (2)}$$

where LT is the distance from the most object-side optical surface to the most image-side optical surface of the zoom lens at the telephoto end, and fT is the focal length of the zoom lens at the telephoto end.

In the case of a retractable zoom lens, setting the length of the zoom lens at the telephoto end within the range of conditional expression (2) can reduce the retracted length. Falling below the lower limit of conditional expression (2) increases the refractive power of each lens unit and makes the aberration correction difficult.

Exceeding the upper limit of conditional expression (2) reduces the refractive power of each lens unit and reduces the zoom ratio.

(H) With the increase in the number of pixels, the pixel pitch of the image pickup element decreases.

Therefore, if the aperture diameter of the stop is fixed during zooming, performance degradation due to diffraction becomes considerable with the increase in zoom ratio. To prevent that, each embodiment has a stop in which the aperture diameter is variable according to zoom state. Specifically, the aperture diameter at the telephoto end is larger than that at the wide-angle end. This reduces the performance degradation due to diffraction. Since the aperture diameter is variable according to zoom state, rays can be blocked according to zoom state, and aberrations can be effectively corrected.

(I) In each embodiment, the last lens of the second lens unit L2 is a biconcave negative lens. In this case, the total system of the second lens unit L2 and the third lens unit L3 can reduce aberrations such as spherical aberration mainly at the telephoto end.

Figure 11:
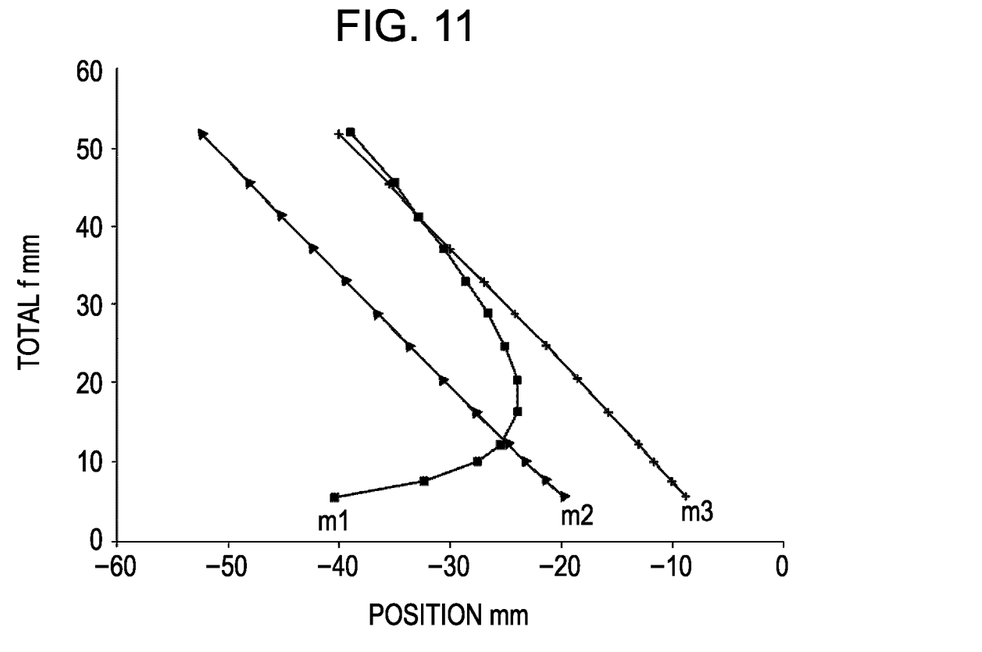
FIG. 11 illustrates the loci of principal point positions of Numerical Embodiment 3 of the present invention.
Figure 12:
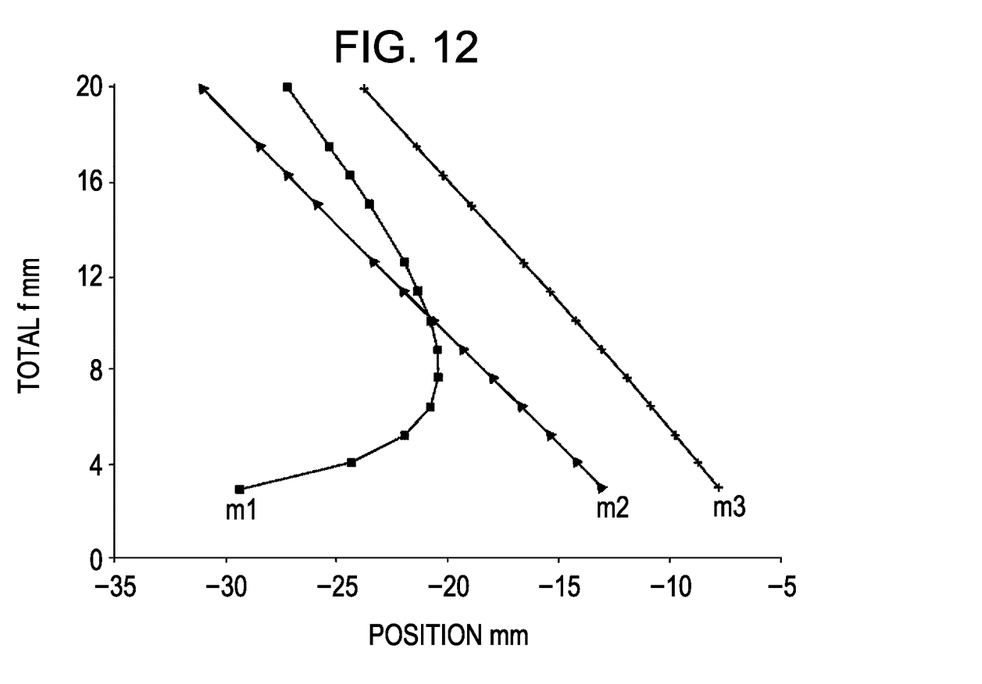
FIG. 12 illustrates the loci of principal point positions of Numerical Embodiment 4 of the present invention.

(J) In order to reduce the overall length, as in below-described Numeral Embodiments 1 and 3 (as shown in FIGS. 9 and 11), the movement locus of the object side principal point of the third lens unit L3 should intersect with the movement locus of the image side principal point of the first lens unit L1. In this case, the movement locus of the image side principal point of the first lens unit L1 intersects with the movement locus of the object side principal point of the second lens unit L2 as shown in FIGS. 9 and 11. However, the movement locus of the object side principal point of the second lens unit L2 may intersect with the movement locus of the object side principal point of the third lens unit L3 without intersecting with the movement locus of the image side principal point of the first lens unit L1.

(K) As in below-described Numeral Embodiments 1 to 4, the magnification of the zoom lenses of the embodiments should be larger than 6.3 times (should be larger than 6.6 times) and smaller than 50 times (should be smaller than 30 times, or should be smaller than 20 times).

Of course, to the above-described conditions (A) to (K) can be added other conditions described in the embodiments.

The following are Numerical Embodiments 1 to 4 of the present invention. In each numerical embodiment, reference numeral i denotes the order from the object side. Reference letter Ri denotes the radius of curvature of the i-th surface in order from the object side. Reference letter di denotes the i-th lens thickness or air gap in order from the object side. Reference letters ndi and νi denote the refractive index and the Abbe number, respectively, for the d-line, of the i-th material in order from the object side.

An aspherical shape is expressed by the following expression:

$$X = \frac{(1/r)H^2}{1+\sqrt{(1-(1+k)(H/r)^2)}} + AH^2 + BH^4 + CH^6 + DH^8 + EH^{10}$$

Expression 1 where X axis is in the direction of the optical axis, H axis is in a direction perpendicular to the optical axis, the traveling direction of light is positive, R is a paraxial radius of curvature, k is an eccentricity, and A, B, C, D, and E are aspherical coefficients.

In addition, "e-Z" means "$10^{-z}$." Reference letter f denotes the focal length, reference letter Fno denotes the F-number, and reference letter ω denotes the half field angle (2ω denotes the full field angle).

Table 1 shows the relationships among the above conditional expressions, the object side principal point position H1 of the first lens unit L1 (the distance from the first surface when the image side is positive), and numerical values in the numerical embodiments. H1 should satisfy 0.2<H1<6 (or should satisfy 0.29<H1<3.8).

| | Magnification: about 10 times | | |
|---|---|---|---|
| | (Numerical Embodiment 1) | | |
| | Wide-angle End | Middle | Telephoto End |
| f | 6.24 | 20.8 | 62.4 |
| Fno | 2.84 | 4.4 | 5.8 |
| 2ω | 74° | 24° | 8.2° |

| s | R | d | nd | ν |
|---|---|---|---|---|
| 1 | −48.9993 | 0.6 | 1.497 | 81.5446 |
| 2 | 12.6581 | valiable | 1 | 0 |
| 3 | 8.5 | 3.5 | 1.65764 | 45.2598 |
| 4 | 39.5992 | 2.35692 | 1 | 0 |
| 5 | stop | 0.2 | 1 | 0 |
| 6 | 11.302 | 3.8 | 1.59643 | 65.8229 |
| 7 | −13.1388 | 0.6 | 2.0017 | 20.5996 |
| 8 | 9.64273 | valiable | 1 | 0 |
| 9 | 32.8178 | 4 | 2.0017 | 20.5996 |
| 10 | −7.72887 | 0.2 | 1 | 0 |
| 11 | −36.3668 | 3.7 | 1.56529 | 69.7505 |
| 12 | −16.0753 | 0.6 | 2.0017 | 20.5996 |

-continued

| | | Magnification: about 10 times | | | |
|---|---|---|---|---|---|
| 13 | 11.424 | valiable | 1 | 0 | |
| 14 | infinity | 0 | 1 | 0 | |

(Aspherical Coefficient)

| s | R | k | A | B | C | D | E |
|---|---|---|---|---|---|---|---|
| 1 | −48.9993 | −121.843 | −0.00005 | 4.27128E−07 | −1.08254E−09 | 0 | 0 |
| 2 | 12.6581 | 0.0908082 | −0.000009 | −0.000002 | 2.09238E−08 | −1.02865E−10 | −4.25751E−19 |
| 3 | 8.5 | −0.474113 | −0.000015 | −4.4624E−07 | −2.224E−08 | 0 | 0 |
| 4 | 39.5992 | 23.8196 | −0.000149296 | −0.000003 | 1.09398E−08 | 0 | 0 |
| 6 | 11.302 | 0.647008 | −0.000032 | −0.00001 | −6.09693E−08 | 0 | 0 |
| 8 | 9.64278 | 1.50524 | 0.000888709 | −0.000026 | −2.72613E−07 | 0 | 0 |
| 9 | 32.8178 | −33.2208 | 0.000377104 | −0.000018 | 1.9122E−07 | 0 | 0 |
| 10 | −7.72887 | −5.67872 | −0.000226852 | −0.000003 | 2.47158E−08 | 0 | 0 |
| 11 | −36.3668 | −203.159 | 0.000812369 | 0.000003 | 8.42258E−08 | 0 | 0 |
| 13 | 11.424 | 3.93056 | −0.000892384 | 0.000043 | −0.000001 | 0 | 0 |

(Zoom Distance)

| f | 6.2405 | 20.7996 | 62.3944 |
|---|---|---|---|
| d2 | 38.26296667 | 9.510659434 | 0.4 |
| d8 | 1.2 | 2.713592499 | 3.400618063 |
| d13 | 4.049412351 | 13.38475624 | 41.64046491 |

| Magnification: about 8.93 times | | |
|---|---|---|
| (Numerical Embodiment 2) | | |
| Wide-angle End | Middle | Telephoto End |

| | | | |
|---|---|---|---|
| f | 2.91 | 10.4 | 26 |
| Fno | 1.86 | 3.12 | 5.83 |
| 2ω | 78° | 24.5° | 9.8° |

| s | R | d | nd | v |
|---|---|---|---|---|
| 1 | 20.1971 | 3.5 | 1.90681 | 21.1513 |
| 2 | −39.3721 | 0.6 | 1.883 | 40.778 |
| 3 | 5.29564 | valiable | 1 | 0 |
| 4 | 4.25368 | 2 | 1.62183 | 54.4869 |
| 5 | 11.7366 | 1.45891 | 1 | 0 |
| 6 | stop | 0.2 | 1 | 0 |
| 7 | 11.0851 | 1.8 | 1.8061 | 40.7337 |
| 8 | −5.15828 | 0.6 | 1.90681 | 21.1513 |
| 9 | 6.37789 | valiable | 1 | 0 |
| 10 | 25.317 | 2 | 2.0017 | 20.5996 |
| 11 | −4.99361 | 0.2 | 1 | 0 |
| 12 | −89.4864 | 1.95625 | 1.68893 | 31.0749 |
| 13 | −5.29023 | 0.6 | 1.90681 | 21.1513 |
| 14 | 8.3768 | valiable | 1 | 0 |
| 15 | infinity | 0 | 1 | 0 |

(Aspherical Coefficient)

| s | R | k | A | B | C |
|---|---|---|---|---|---|
| 1 | 20.1971 | 2.37998 | −0.000358477 | 0.000004 | −1.80565E−08 |
| 3 | 5.29564 | −2.21749 | 0.000478753 | −0.000004 | 2.08808E−07 |
| 4 | 4.25368 | −0.108533 | −0.000545463 | 0.000043 | −0.000001 |
| 5 | 11.7386 | 9.99212 | 0.0021867 | 0.000182872 | −0.000016 |
| 7 | 11.0851 | −7.97238 | −0.00240839 | 0.000031 | −0.000027 |
| 9 | 6.37789 | 4.5459 | 0.000574774 | −0.000215105 | −0.000057 |
| 10 | 25.317 | −21.714 | 0.00124965 | −0.000163744 | 0.000016 |
| 11 | −4.99361 | −3.65995 | 0.000853755 | −0.000083 | 0.000007 |
| 12 | −89.4864 | −99.9664 | 0.00593075 | 0.000289131 | −0.000014 |
| 14 | 8.3768 | −3.81685 | 0.000899176 | 0.000599129 | −0.000007 |

-continued

| Magnification: about 8.93 times | | | |
|---|---|---|---|
| (Zoom Distance) | | | |
| f | 2.9123 | 10.3992 | 25.9994 |
| d3 | 21.88483836 | 4.9771187 | 0.6 |
| d9 | 0.6 | 1.366960035 | 1.721361567 |
| d14 | 2.599996116 | 8.358025408 | 21.01722599 |

Magnification: about 8.97 times (Numerical Embodiment 3)

|  | Wide-angle End | Middle | Telephoto End |
|---|---|---|---|
| f | 5.8 | 20.8 | 52 |
| Fno | 2.8 | 4.22 | 5.64 |
| 2ω | 78° | 24.4° | 9.8° |

| s | R | d | nd | ν |
|---|---|---|---|---|
| 1 | 35.2377 | 3.5 | 1.90696 | 22.5007 |
| 2 | −47.8721 | 0.6 | 1.88299 | 40.7644 |
| 3 | 10.42 | valiable | 1 | 0 |
| 4 | 6.88417 | 3.48319 | 1.67695 | 54.1493 |
| 5 | 23.7779 | 1.60223 | 1 | 0 |
| 6 | stop | 1.64014 | 1 | 0 |
| 7 | 23.4205 | 2.4 | 1.81128 | 43.9171 |
| 8 | −6.08448 | 1 | 1.90855 | 22.2808 |
| 9 | 9.47953 | valiable | 1 | 0 |
| 10 | 42.1498 | 2.5 | 2.0017 | 20.5996 |
| 11 | −6.53018 | 0.458327 | 1 | 0 |
| 12 | −17.1421 | 2.5 | 1.67837 | 33.946 |
| 13 | −11.4353 | 0.6 | 1.9091 | 22.269 |
| 14 | 12.5976 | valiable | 1 | 0 |
| 15 | infinity | 0 | 1 | 0 |

(Aspherical Coefficient)

| s | R | k | A | B | C |
|---|---|---|---|---|---|
| 1 | 35.2377 | −38.4895 | −0.000047 | 2.38E−07 | −2.80E−10 |
| 3 | 10.42 | −3.90855 | 0.000096 | −0.000001 | 5.36E−09 |
| 4 | 6.88417 | −0.16134 | −0.000047 | 6.84E−08 | −2.88E−08 |
| 6 | 23.7779 | 13.2248 | −0.00016512 | −0.000003 | −1.12E−07 |
| 7 | 23.4205 | −14.5329 | −0.000497945 | −0.000027 | −0.000001 |
| 9 | 9.47953 | 3.27162 | 0.000458345 | −0.000036 | −0.000002 |
| 10 | 42.1498 | 44.2206 | 0.000195805 | −0.000024 | 4.08E−07 |
| 11 | −6.53016 | −4.90072 | −0.000297074 | −0.000002 | 1.43E−09 |
| 12 | −17.1421 | −41.9792 | 0.00148873 | 0.000023 | −4.23E−07 |
| 14 | 12.5976 | 6.90253 | −0.000633084 | 0.00006 | −0.000002 |

(Zoom Distance)

| f | 5.824 | 20.7997 | 51.9987 |
|---|---|---|---|
| d3 | 34.5664589 | 7.290082034 | 0.4 |
| d9 | 0.913213797 | 2.134713845 | 2.487032684 |
| d14 | 4.236439112 | 13.97247149 | 35.24552978 |

Magnification: about 6.94 times (Numerical Embodiment 4)

|  | Wide-angle End | Middle | Telephoto End |
|---|---|---|---|
| f | 2.88 | 8.8 | 20.0 |
| Fno | 2.0 | 3.2 | 5.4 |
| 2ω | 84° | 28.9° | 12.8° |

-continued

Magnification: about 6.94 times

| s | R | d | nd | ν |
|---|---|---|---|---|
| 1 | −33.7573 | 3 | 1.90681 | 21.1513 |
| 2 | −10 | 0.6 | 1.883 | 40.7645 |
| 3 | 10.0984 | valiable | 1 | 0 |
| 4 | 5.19905 | 1.8 | 1.6779 | 55.3368 |
| 5 | 11.6882 | 1.4 | 1 | 0 |
| 6 | stop | 0.3 | 1 | 0 |
| 7 | −256.427 | 1 | 1.8061 | 40.7337 |
| 8 | −5.5696 | 0.6 | 1.90681 | 21.1513 |
| 9 | 41.5138 | valiable | 1 | 0 |
| 10 | 21.9728 | 2 | 1.90681 | 21.1513 |
| 11 | −9.45901 | 0.732335 | 1 | 0 |
| 12 | 7.66652 | 2.4 | 1.68893 | 31.0749 |
| 13 | −5.26913 | 0.6 | 1.90681 | 21.1513 |
| 14 | 6.24939 | valiable | 1 | 0 |
| 15 | infinity | 0 | 1 | 0 |

(Aspherical Coefficient)

| s | R | k | A | B | C |
|---|---|---|---|---|---|
| 3 | 10.0984 | −8.48841 | 0.000916404 | −0.00002 | 2.48034E−07 |
| 4 | 5.19905 | −0.342056 | −0.00008 | 0.000002 | 1.79802E−07 |
| 9 | 41.5138 | 59.8093 | 0.00123537 | 0.000009 | 0.000001 |
| 12 | 7.66652 | 2.58814 | −0.000185155 | −0.000012 | 0 |

(Zoom Distance)

| f | 2.8881 | 8.8318 | 20.016 |
|---|---|---|---|
| d3 | 20.44091107 | 5.233162814 | 0.4 |
| d9 | 0.7 | 1.671239098 | 2.634418645 |
| d14 | 3.426753907 | 8.716864779 | 19.43501222 |

TABLE 1

|  | H1 | |f1/f2| | LT/fT |
|---|---|---|---|
| Numerical Embodiment 1 | 0.317492 | 0.860475 | 0.374385 |
| Numerical Embodiment 2 | 3.40544 | 0.717527 | 0.662958 |
| Numerical Embodiment 3 | 3.37439 | 0.959834 | 0.445606 |
| Numerical Embodiment 4 | 1.3906 | 0.458459 | 0.922601 |

Next, an embodiment of a digital still camera (image pickup apparatus) in which a zoom lens of the present invention is used as a photographing optical system will be described with reference to FIG. 13.

In FIG. 13, reference numeral 20 denotes a main body of a camera, and reference numeral 21 denotes a photographing optical system, which is a zoom lens of the present invention. Reference numeral 22 denotes a solid-state image pickup element (photoelectric conversion element), such as a CCD sensor or CMOS sensor, which is housed in the main body of the camera and which detects an object image formed by the photographing optical system 21 (light flux through the photographing optical system 21). Reference numeral 23 denotes a memory, which stores information corresponding to the object image photoelectric-converted by the image pickup element 22. Reference numeral 24 denotes a finder, which is, for example, a liquid crystal display panel and which is used for observing the object image formed on the image pickup element 22.

An image pickup apparatus that is small and that has high optical performance is achieved by applying a zoom lens of the present invention to an image pickup apparatus, such as a digital still camera, as described above. More specifically, the embodiments enable even a zoom lens having a zoom ratio of more than six to have a comparatively small number of lenses and to have a short overall length.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-002056 filed Jan. 10, 2007, which is hereby incorporated by reference herein in its entirety.

What is claimed is:

1. A zoom lens comprising in order from an object side to an image side:
    a first lens unit of negative refractive power;
    a second lens unit of positive refractive power; and
    a third lens unit of positive refractive power,
    wherein the first lens unit moves in a locus convex toward the image side and the second lens unit moves toward the object side during zooming from a wide-angle end to a telephoto end,
    wherein an object side principal point position of the first lens unit is within the first lens unit, and
    wherein a movement locus of the image side principal point position of the first lens unit during zooming from the wide-angle end to the telephoto end intersects with a movement locus of an object side principal point position of the second lens unit during zooming from the wide-angle end to the telephoto end.

2. The zoom lens according to claim 1, wherein the following condition is satisfied:

$$0.3 < |f1/f2| < 1,$$

where f1 is the focal length of the first lens unit, and f2 is the focal length of the second lens unit.

3. The zoom lens according to claim 1, wherein the following condition is satisfied:

$$0.3 < LT/fT < 1,$$

where LT is the distance from the most object-side optical surface to the most image-side optical surface of the zoom lens at the telephoto end, and fT is the focal length of the zoom lens at the telephoto end.

4. The zoom lens according to claim 1, wherein the first lens unit has no more than two lenses, and the first lens unit includes at least one aspherical surface.

5. The zoom lens according to claim 1, further comprising an aperture stop disposed between two adjacent lenses of the second lens unit, wherein the aperture stop moves together with the second lens unit during zooming from the wide-angle end to the telephoto end.

6. The zoom lens according to claim 1, wherein the most image-side lens in the second lens unit is a negative lens, and the second lens unit has two positive lenses other than the negative lens.

7. The zoom lens according to claim 1, wherein the most object-side surface in the second lens unit is an aspherical surface convex toward the object side.

8. The zoom lens according to claim 1, wherein the third lens unit has no more than two lenses including a positive lens and a negative lens.

9. The zoom lens according to claim 1, wherein the third lens unit moves monotonously from the image side to the object side during zooming from the wide-angle end to the telephoto end.

10. An image pickup apparatus comprising:
    a zoom lens; and
    an image pickup element configured to detect light flux through the zoom lens,
    wherein the zoom lens includes in order from an object side to an image side:
    a first lens unit of negative refractive power;
    a second lens unit of positive refractive power; and
    a third lens unit of positive refractive power,
    wherein the first lens unit moves in a locus convex toward the image side and the second lens unit moves toward the object side during zooming from a wide-angle end to a telephoto end,
    wherein an object side principal point position of the first lens unit is within the first lens unit, and
    wherein a movement locus of the image side principal point position of the first lens unit during zooming from the wide-angle end to the telephoto end intersects with a movement locus of an object side principal point position of the second lens unit during zooming from the wide-angle end to the telephoto end.

* * * * *